United States Patent [19]
Vanzetti et al.

[11] 3,803,413
[45] Apr. 9, 1974

[54] INFRARED NON-CONTACT SYSTEM FOR INSPECTION OF INFRARED EMITTING COMPONENTS IN A DEVICE

[75] Inventors: Riccardo Vanzetti, Walpole; Ashod S. Dostoomian, Stoughton, both of Mass.

[73] Assignee: Vanzetti Infrared & Computer Systems, Inc., Canton, Mass.

[22] Filed: May 1, 1972

[21] Appl. No.: 249,058

[52] U.S. Cl. .............................. 250/338, 250/342
[51] Int. Cl. ............................................. G01j 1/02
[58] Field of Search ............. 250/83 R, 83.3 H, 338, 250/342

[56] References Cited
UNITED STATES PATENTS

| | | | |
|---|---|---|---|
| 3,511,965 | 5/1970 | Johnson | 250/83.3 H X |
| 3,395,608 | 8/1968 | Neill | 250/83.3 H X |
| 3,378,685 | 4/1968 | Green et al. | 250/83.3 H |
| 3,433,052 | 3/1969 | Maley | 250/83.3 H X |
| 3,218,909 | 11/1965 | Fain | 250/83.3 H X |

*Primary Examiner*—Archie R. Borchelt
*Attorney, Agent, or Firm*—Seidel, Gonda & Goldhammer

[57] ABSTRACT

The system scans a device such as printed circuit board, under rigid geometrical and repeatable constraints. The infrared radiated from the electronic component is detected during each scan and compared to a preprogrammed expected result. The result of the comparison is printed out for evaluation.

8 Claims, 4 Drawing Figures

FIG. 3A
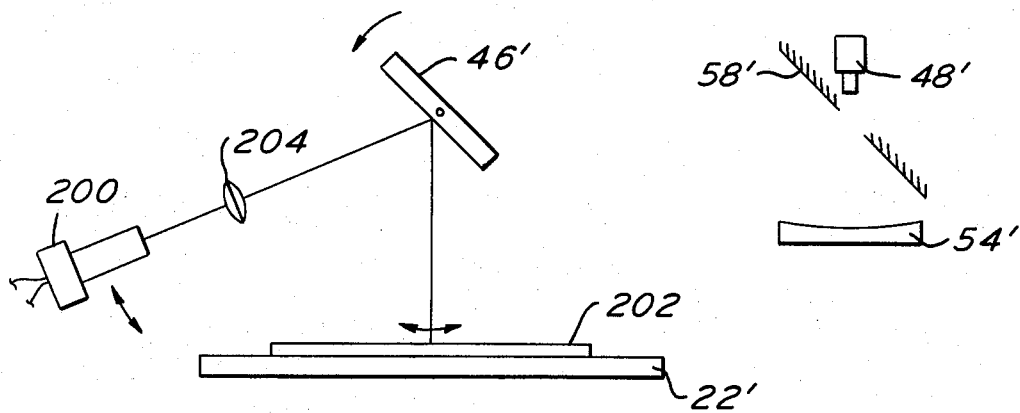
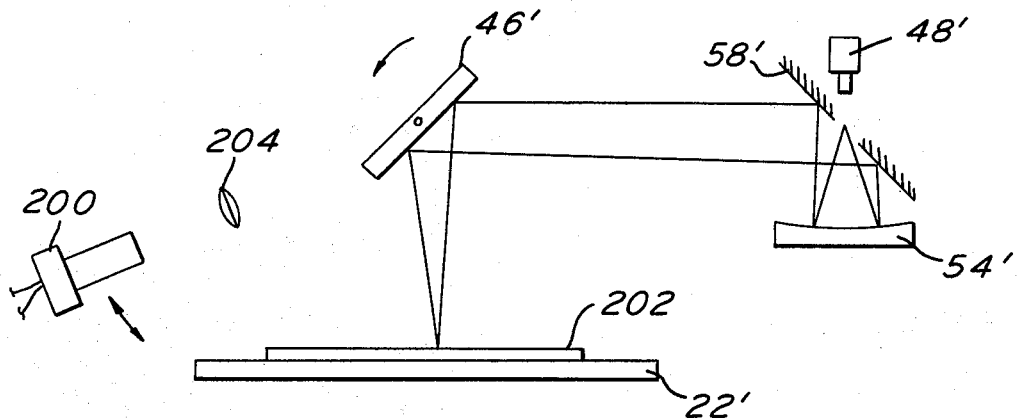
FIG. 3B

INFRARED NON-CONTACT SYSTEM FOR INSPECTION OF INFRARED EMITTING COMPONENTS IN A DEVICE

This invention relates to an infrared non-contact sytem for inspection of a plurality of different infrared radiating elements making up a device. More particularly, the present invention relates to a system for infrared non-contact inspection of electronic components in a complete device such as a printed circuit board.

Infrared inspection of components or devices is not, per se, a novel concept. It has been known for a number of years that the infrared signals can be measured and the information resulting from such measurement can be indicative of certain characteristics of the signal source. The present invention is a new and improved system for inspection of devices made up of several infrared emitting sources.

There are many advantages to infrared inspection. Among these is the fact that it is a non-contact method. Thus, the device being inspected can be operated in its normal and conventional manner without having to bear the additional load of inspection equipment. This can be particularly important when inspecting electronic circuit devices. Yet another advantage of infrared inspection is that it is capable of observing defects that would not be apparent through other methods of inspection. Conventional testing of electronic devices is necessarily limited to measuring electrical parameters resulting from the compounded action of several components, whose individual performance therefore cannot be checked. As a result, about three percent of all printed circuits which pass conventional testing actually contain incipient defects which cause early failures in the field. On the other hand, infrared inspection makes it possible to detect most of these defects even though they would be missed by conventional testing techniques. This capability is available in infrared detecting because it measures the performance of every active component in the circuit. Whereas most conventional testing procedures measure only a few test points.

Considering an electronic device, such as a completed printed circuit upon which discrete components have been mounted, it has been observed that each component radiates infrared as it dissipates heat. Moreover, the amount of radiation changes with the peformance of the component. Thus, each individual printed circuit has unique infrared radiation characteristics and these characteristics can be measured from point to point.

Using the foregoing concept, the present invention provides a system for scanning an electronic circuit assembly and detecting the infrared radiation at predetermined geometrical points. The radiation thus detected is converted to machine readable language and compared to standard information for the same device. Such comparison permits the system to determine deviations from the standard and to locate the position of such deviations on the electronic assembly.

For example, information regarding a standard circuit assembly can be stored in an electronic memory. Inspection of duplicate assemblies will show a chain of relatively hot or cold components. By evaluating such information and comparing it to standard information stored in a memory, it is possible to determine the relative merits of the assembly under inspection. The information thus determined can be used to evaluate the performance of heat sinks, general thermal behavior, electrical stress, and manufacturing flaws. For example, a cold component may be downstream from a short or open circuit on a printed circuit card. Alternatively, a hot component may result from a too low value resistor just ahead of it.

The infrared non-contact system for inspection of different infrared radiating elements mounted in a particular configuration comprises, basically, an optical infrared scanning system and a memory which stores operational information and processes information that is detected during the scan. The system is set up by inserting into a memory information regarding the location of each infrared emitting element on an electrical device. In addition, "standard" information regarding the infrared emissions of each element are stored in the memory. Once the foregoing information has been stored, the system is ready to test subsequent, like electronic devices.

Each subsequent electronic device is inserted into the system and scanned from position to position. Infrared emissions are detected and converted to machine readable language. The data thus converted is compared to the standard and variants from such standard are indicated by an output device. In the alternative, all of the data can be printed out in side by side fashion with the standard data and comparisons made by the operator.

The scanning system operates under rigid mechanical constraints. Accurate and repeatable control is achieved by using a computer with a memory to store all control information. Information is stored in digital form. In this way the accuracy of each scan is maintained from device to device.

For the purpose of illustrating the invention, there are shown in the drawings forms which are presently preferred; it being understood, however, that this invention is not limited to the precise arrangements and instrumentalities shown.

FIG. 3A shows another embodiment of the present invention incorporating an external heat source.

FIG. 3B shows the embodiment of FIG. 3A with the mirror in a different angular position.

Figure 1:
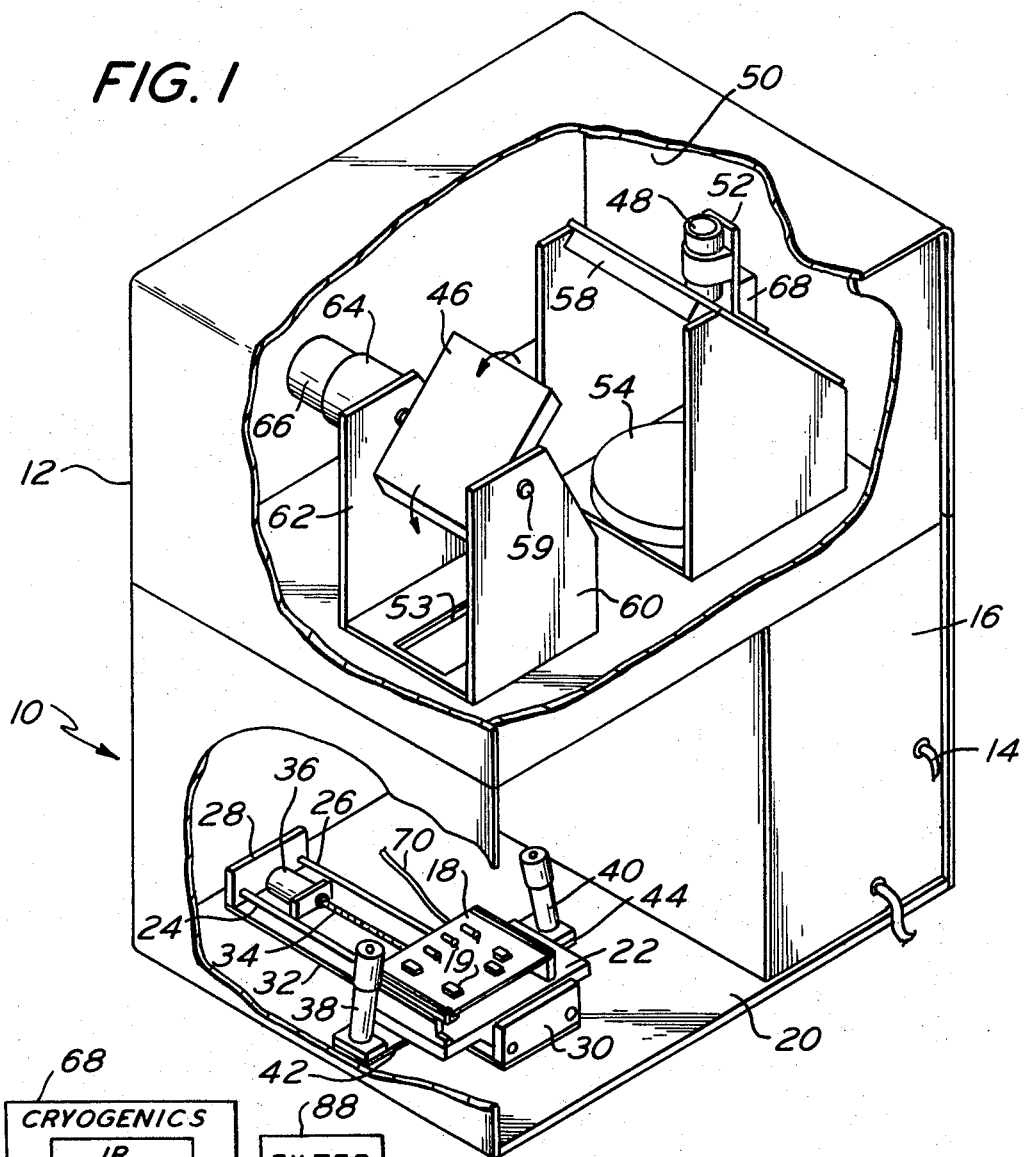
FIG. 1 is a perspective view of an infrared non-contact system.

Referring now to the drawing in detail, wherein like numerals indicate like elements, there is shown in FIG. 1 a perspective view of an infrared non-contact system 10 for inspection of a device having a plurality of different infrared radiating components.

The infrared non-contact system 10 is shown contained within an enclosure 12, with the exception of an input-output device not shown in FIG. 1. The input-output device could take several forms. For example, it could be a teletype system with a punched tape or magnetic tape storage mechanism. In addition, it can include means to read the punched or magnetic tape. Connection to the teletype input-output and tape punch may be via cable 14 leading into compartment 16 within which is storage space for punched tapes and interface connectors.

The device 18 to be inspected is mounted within compartment 20 on a carriage 22. By way of example, but not limitation, the device for inspection may consist of a printed circuit board upon which a plurality of discrete components have been mounted. Such components may consist of resistors, capacitors, inductive devices, semi-conductor devices, or other electronic components. It should be understood however that the device 18 need not necessarily be a printed circuit board. It should be another form of electronic device having discrete components which emit infrared radiation. Indeed, the device 18 need not even be electronic or electrical in nature as long as it includes infrared emitting areas or elements.

The device 18 is rigidly positioned by clamps on carriage 22. Carriage 22 is mounted for reciprocatory movement on slide bars 24 and 26. Slide bars 24 and 26 are mounted in rigid supports 28 and 30 fixed to a base 32. Base 32 is rigidly fixed to the bottom of compartment 20.

Carriage 22 supports a collar (not shown) in which have been formed female screw threads. The female screw threads in turn receive threaded drive shaft 34 which is rotatably connected to the output shaft of stepping motor 36. Preferably, the male threads on drive shaft 34 and the female threads in the collar on carriage 22 are machined to be as accurate as possible and to mate with only the minimum amount of play necessary for shaft 34 to permit them to rotate within the collar and hence cause carriage 22 to translate along the slide bars 24 and 26. The direction of rotation of the drive shaft 34 determines the direction of translation of carriage 22. The amount of rotation of shaft 34 is dependent upon energization of the stepping motor 36. For convenience, but not limitation, the direction of movement of carriage 22 along the slide bars 24 and 26 will be designated as the Y axis. However, it should be understood that such designation is not intended to be limiting. Stepping motor 36, as is conventional for such devices, indexes the carriage 22 along the Y axis in discrete steps of predetermined length. Motor 36 is controlled by discrete pulses received from memory-computer 80 as described hereinafter.

The base 32 supports, in addition to the plates 28 and 30, two black body infrared emitters 38 and 40. Emitters 38 and 40 are mounted on brackets 42 and 44, respectively, which in turn are fixed to the base 32. Thus, the emitters 38 and 40 are stationary and independent of the position of carriage 22. Each emitter emits infrared radiation upwardly toward the scanning mirror 46 for calibration and reference as explained hereinafter. It should be noted that each of the black body emitters 38 and 40 is mounted at an angle with respect to the vertical. Such angle is chosen to be 11° with respect to the vertical such that the full angle included between each of the emitters is 22°. For purposes of explanation, the angle shall be defined as the scan angle. It should be understood, however, that the scan angle could be varied, depending upon the size of the device 18. To cover a full scan angle of 22°, the scanning mirror 46 rotates 11°. The half angle rotation of the mirror is possible because of the doubling effect due to the fact that the angle of incidence equals the angle of reflection.

An infrared detector 48 is fixed in position on bracket 52. The function of infrared detector 48 is to receive infrared radiation emitted from components on the device 18 and as well as the emitters 38 and 40. This radiation is transduced into electronic signals and processed as hereinafter described. Preferably, the infrared detector 48 is provided with a cryogenic refrigeration system 68 to provide stability and improved detection capabilities. The cryogenic refrigeration system may, for example, be an open cycle, liquid nitrogen cryogenic system.

The entrance window of infrared detector 48 is focused on the surface of device 18 by focusing mirror 54. Infrared radiation emitted by device 18 and emitters 38 and 40 is directed to the detector 48 by passing it through opening 53 in the base of scanning compartment 50. Such radiation is reflected by rotating scanning mirror 46 to mirror 58. Mirror 58 is mounted at an angle of 45° with respect to the optical axis of paraboli mirror 54. Infrared radiation incident on the mirror 54 is reflected into the entrance window of detector 48.

Scanning mirror 46 is fixedly mounted on shaft 59 which in turn is mounted in appropriate bearings in brackets 60 and 62. Scanning mirror 46 is rotated in a counterclockwise direction by a direct current torque motor 64 mounted on bracket 62. Shaft encoder 66 is connected to the output shaft of torque motor 64. Shaft encoder 66 is a pulse generator which generates discrete pulses according to a predetermined amount of rotation of the shaft 58 and hence the mirror 46. For example, shaft encoder 66 could generate one pulse for each angular minute of rotation of mirror 46. Such pulses, when properly counted, provide information as to the precise angular position of the scanning mirror 46. If desired, the scanning mirror 46 could be made into a polygon to be reflective of infrared radiation on each side thereof. Thus, infrared radiation emitted by the device 18 would be present at the entrance window of infrared detector 48 as many times as the polygon's sides during each 360° of rotation of the mirror.

From the foregoing, it should be apparent that the mirror 46 effectively scans the view of the entrance window of detector 48 across the device 18. Moreover, the mirror 46 is positioned so that the direction of such scan is transverse to the direction of movement of the carriage 22 along the Y-axis. For convenience of description, but not limitation, the direction of scan of the detector 48 across the device 18 will be referred to as the X-axis. Moreover, the X-axis is at 90° to the Y-axis and hence the two axes define a Cartesian coordinate system. Although a Cartesian coordinate system is described herein, it should be understood that other coordinate systems could be used. For example, a polar coordinate system could be used if the mirror 46 were properly counted to rotate about a polar axis. The purpose in choosing any coordinate system is to define the precise position being scanned on the device 18 as hereinafter explained.

For the purpose of achieving accuracy and repeatability, the mechanism for displacing the device 18 along the T-axis and for moving the point of view of detector 48 along the X-axis the scan line should be held to rigid specifications and close tolerances. By so designing the system, each duplicate of the device 18 can be accurately inspected.

Cabling 70 can be connected to one or several appropriate power supplies for the electrical excitation of the device 18. The power supplies are not shown. Each of several power supplies may provide simultaneous electrical excitation of several duplicate devices 18 to be tested. By way of example six power supplies could provide for the simultaneous excitation of the one device under test and five duplicate devices awaiting testing.

Thus, each of the devices is given an opportunity to reach a thermally steady state operating condition before it is placed under test. The power supplies may be designed to provide the required operating signals including direct current, pulses, sinusoidal signals, and appropraite loading of inputs and outputs. By providing a plurality of power supplies and cables, no connections or disconnections are required for the devices to move from the preheat mode to the test mode on carriage 22.

Figure 2:
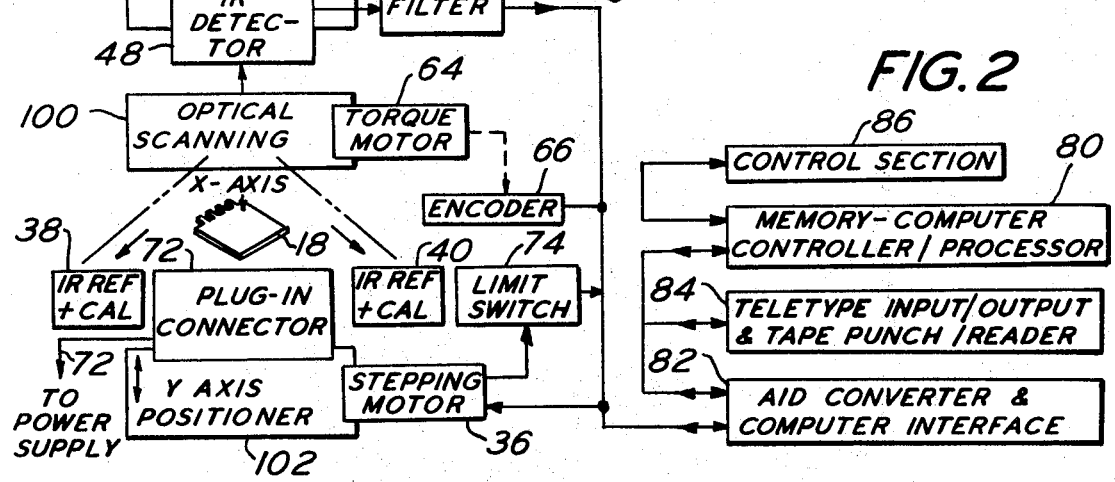
FIG. 2 is a schematic block diagram functionally illustrating the operation of the system.

Referring now to FIG. 2, there is shown a schematic block diagram of the electrical components which make up the system 10. For convenience of reference, the optical scanning system described above has been designated generally as 100. The device 18 is shown schematically spaced from the plug-in connector 72. The plug-in connector 72 is connected by the cable 70 to the power supply, as illustrated.

The apparatus for positioning the device 18 along the Y-axis, including the mechanism described hereinabove is designated as the Y-axis positioner 102 and is shown as being mechanically connected to the stepping motor 36.

The stepping motor 36 is electrically connected to the limit switch 74. Limit switch 74 is mechanically activated by the movement of carriage 22 against its actuator.

As best shown in FIG. 1, the device 18 has mounted thereon a number of discrete components 19. The position of each component 19 on the device 18 can be defined by the X and Y coordinates defined hereinabove. The stepping motor 36 indexes the device 18 along the Y-axis. The detector 48 is scanned along the X-axis. The mirror 54 is designed so that the optical scanning system has a resolution that is sufficiently small to make such coordinates meaningful. For example, the resolution of the optical scanning system may define a flying spot having a diameter of approximately 0.5 millimeter. By way of example, but not limitation, a system designed to handle small printed circuit boards from small sizes up to 8 × 12 inches can have 240 lines and 200 elements per line. Of course a different number of lines and elements per line can be used, if required.

Basic control and processing for the system is provided by the memory-computer 80 which may be any small computer having a drum or other form of memory for the storage of information, both control and test, as hereinafter described. Such computers are well known, available on the market, and hence need not be described in detail. The memory-computer 80 is interfaced with the rest of the system by the analog to digital converter and computer interface 82. The function of the analog to digital converter and computer interface 82 is, as suggested by its title, to convert the analog information received from the detector 48 and the encoder 66, convert the same to digital information which can be handled by the computer, and also interface such information with the computer 80. The analog-digital converter and computer interface 82 also interfaces control information from the computer to the rest of the system for directing the operation of the system 10; e.g., sending control signals to the stepping motor 36.

As previously indicated, the system is also provided with an input-output device in the form of a teletype and tape punch-reader 84. The teletype 84 provides a method for reading information out of the memory of memory-computer 80. It also provides a means for inserting information into the memory-computer 80 by means of punched tape or directly. Such teletype machines and tape punch-readers are well known and hence need not be described in detail. Finally, the system is provided with a basic control section 86 for providing overall control to the memory-computer.

The system 10 is set up and used in the following manner. A clear plastic overlay is accurately positioned over the device 18. The overlay has printed thereon Cartesian X and Y coordinates corresponding to the X and Y axes of the carriage and scanning system 100. The user observes the position of each component 19 on the device 18 as defined by the coordinate system. Using a decimal code which is automatically converted to a digital code, the X and Y axes location of each component is inserted into the memory of the memory-computer 80 using the teletypewriter 84.

The device 18 is then mounted on the carriage 22 and the system energized to cause the infrared detector 48 to scan the device 18 line by line. The output of the infrared detector 48 is passed through the electronic filter 88 to the computer interface 82 and then to the memory-computer 80. It is a straightforward procedure to program the computer 80 so that it at all times knows the position of the scan by means of the output of encoder 66. The computer 80 also knows the position of the scan along the Y axis since it is preprogrammed to initiate the digital signals for operating the stepping motor 36.

It is also a straightforward procedure to program the memory-computer 80 such that it records data received from the infrared detector 48 only when the optical scanning system 100 is scanning individual components 19 on the device 18. Thus, only the infrared information regarding particular positions (components, areas or elements) on the device 18 is inserted into the memory of the memory-computer 80. This infrared data is the infrared profile of the device 18.

The foregoing process is preferably repeated for several devices 18 of the same type to arrive at a standard profile as well as the tolerances on the profile for a particular device. Once the standard profile data is determined, the information can be permanently stored, for instance on paper tape through the use of tape punch 84.

The foregoing set up procedure can be duplicated for any number of different devices 18. Thus, the infrared profile for a large number of distinct devices can be generated and stored on punched tape for future use. Thereafter, such tapes are readily available for use in testing.

The operation of the device for testing a number of different devices is as follows. The operator obtains the correct punched tape to start the testing process. The data is fed through the tape punch reader and placed into the computer memory both for control and comparison. Thereafter, the device 18 to be tested is positioned on the carriage 22. The computer 80, operating as a controller, signals the stepping motor 36 and initiates optical scanning. The information from the infrared detector 48 is thereafter transduced and interfaced into the computer memory in the same manner as the initial setup procedure. However, it is stored in a different portion of the memory apart from the standard profile data. Once the system has completed a full scan of the device 18, the computer is then used to compare the new data with the standard profile data, for every programmed point of the target 18, and to subtract one from the other, printing out, in sign and magnitude, any existing deviation. Such printout permits the operator to determine any faults or deficiencies as pointed out in the printout made by the teletype 84. In other words, the memory-computer 80 is programmed not only to provide rigid control but also to compare the standard profile data with the measured thermal value of each preselected component at a particular position. By presetting the values and tolerances for each component, the system can automatically print out data only on those components which deviate from a norm, together with the amount of their deviation.

From the foregoing, it should be observed that the basic system operating under the direction of a computer has the ability to address a particular position in a device 18 and measure or otherwise observe the infrared characteristics of a component located at that position. This is distinct from the concept of taking an overall view of the device 18.

One of the advantages of the system 10 is that through the use of a geometrical configuration and control, it is wholly independent of time. Stated otherwise, the digital stepping motor 36 and the encoder 66 provide all of the control and information for locating the position of the component on the device and segregating the infrared data at that particular position from other infrared data gathered during the scan.

Another advantage of the system as described herein is that during the scan the carriage 22 is moved in one direction only. This permits duplicate and repeatable scans from device to device.

Yet another advantage of the system is that it provides a quantitative read out of the data. Hence no interpretation is required. This simplifies the inspection operation so that it can be performed by relatively unskilled workmen.

At the beginning and at the end of each X axis scan of the device 18, the detector 48 will receive precalibrated infrared radiation from the black body emitters 38 and 40. The data gathered from the emitters 38 and 40 is used for providing calibration and reference points during each scan. Moreover, through the use of appropriate automatic gain circuits, the data can be used to compensate for drift in room temperature and thus make the system independent from ambient room temperature and background infrared noise. Equally important, the emitters provide information as to the beginning and end of a line scan of the device 18.

It should be understood that the system described herein is by no means limited to the evaluation of printed circuit boards or to the testing of manufactured products. It has many other uses. For example, it can be used in the design stage to detect overstressed electronic components in a printed circuit. This allows the designer of the circuit and the product designer to eliminate faulty configurations based on actual test data. By identifying heat problems, designers can select and arrange heat sinks, cooling and ventilation, insulation, based on actual measurements of individual components, rather than of the entire overall device. This results in improved circuit performance, life expectancy, and reliability.

Other possible uses of the system will be obvious to those of ordinary skill in the art.

Still further, it should be noted that the system inspects conventional electronic circuitry. It is not limited in any respect to devices having high heat or infrared dissipation. The system may have a thermal resolution of ±0.1°C at black body emissivity. It is possible, therefore, to read power dissipation levels as low as 1 milliwatt per flat pack integrated circuit. Indeed, it should be noted that the system is based upon the ability to read infrared power dissipation of discrete components in a device, or of individual integrated circuits assembled in printed circuit cards or modules.

Referring now to FIGS. 3A and 3B, there is shown another embodiment of the invention. Thus far it has been assumed that the device 18 includes a plurality of elements 19 that radiate infrared when energized as by a source of electrical energy. However, the invention is not limited to devices that radiate when thermal energization is obtained through electrical energization. There are other devices where it might be convenient to obtain thermal energization through external heat injection, so that they might lend themselves to infrared non-contact inspection. Such devices may be inspected for material integrity, bonding and other characteristics which require thermal energization prior to infrared measurement. Exemplary devices may be bonded sheets, honeycomb assemblies, multilayer printed circuit boards, and similar devices. The embodiment illustrated in FIGS. 3A and 3B provides a modification to the invention to achieve thermal energization of the device.

Testing of devices by thermal energization is not, per se, novel. Known methods of thermally energizing the device include flooding, heat soaking, and heat transfer. Unfortunately, all these methods suffer from one common difficulty - the lateral migration of the heat energizing the target area. This condition greatly reduces spatial resolution and often masks indications of anomalies that consequently remain undetected.

The present invention provides a method and apparatus for overcoming the problem of lateral migration by using a laser for thermal energization of the device. The advantage of a laser is that it provides a pulse point heating. Stated otherwise, a laser is a source of heat energy that provides a means to limit thermal migration because of its high resolution and short time duration (pulse) capabilities. The laser eliminates the difficulty due to lateral heat migration by reducing to a small point and short time the area where heat is injected into the device. The point of heat injection can be stationary or moved with respect to the surface of the device being tested.

The apparatus of FIGS. 1 and 2 can be used as an infrared radiometer focused on the point of heat injection. As such, the apparatus can monitor the speed at which the injected heat is being diffused into the surrounding area. Comparing this information with the projected characteristic of heat diffusion will allow detection of physical anomalies of the material at or near the point of heat injection.

Referring now to FIGS. 3A and 3B, there is shown a modification to the non-contact system 10 incorporating a laser 200 to provide pulsed point heating.

The structure of the scanning system shown in FIG. 3A is essentially the same as that illustrated in FIG. 1. Accordingly, like elements have been designated with like numbers except for the addition of a prime to distinguish one embodiment from the other. Due to the general identity of structure and function, the primed portions need not be described in detail.

As shown, the laser 200 is adjustably mounted to direct coherent radiation toward the rotatable mirror 46'. The laser 200 could generate energy either in the visible or in the infrared region, as desired. Such coherent energy is focused by the optical system 204 on the device 202. The device 202 is supported on the carriage 22' which is translated in a direction coordinate to the direction of rotation of the mirror 46', as previously described.

The laser 200 generates coherent radiation during the period when the mirror 46' is in the position illustrated in FIG. 3A. This is the time period when the detector 48' would be electronically blanked out because it is not receiving infrared from the device 202. The mirror 46' scans the coherent radiation along the same linear path that is subsequently scanned by the infrared detector 48'. The controls can be designed so that the scan of the device 202 is either a single line or a full raster pattern.

Referring now to FIG. 3B, the mirror 46' is shown in position after having rotated 90° from the position illustrated in FIG. 3A. As illustrated, the mirror 46' is in effect scanning the optical window of detector 48' over the same line on the target 202 that was scanned by the laser 200. Thus, the detector 48' sees the same limited area into which thermal energy has been injected by the laser 200. The interval between heat injection and infrared scanning can be varied by changing the position of laser 200.

Depending upon the nature of the device 202 and the particular test being made, there are several variations which can be incorporated into the system as will be apparent to those skilled in the art. Among these variations are changes in the wave length and power of the coherent radiation emitted by laser 200; changes in the duration of the laser pulse; the velocity of the scan by mirror 46'; the variations in the interval between heat injection and infrared detection; the size of the point of injection; and the emissivity of the surface of device 202.

The apparatus illustrated in FIGS. 3A and 3B can be operated in essentially the same manner as the apparatus 10 illustrated in FIGS. 1 and 2. Thus, a profile or expected result can be generated and stored on tape or otherwise. Thereafter, devices to be tested can be sequentially positioned on the carriage 22' and the results compared to the profile.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for inspecting a device made up of a plurality of different infrared radiating elements, comprising means to displace said device along a first axis, an infrared detector, means to scan said infrared detector along an axis coordinate to said first axis, control means for controlling said means to displace said device along said first axis, means to generate an electronic analog signal that corresponds to the instantaneous position of the device that is being scanned by said detector, memory means, said memory means including means for storing infrared information as a standard profile of said device, and means to convert infrared signals detected by said infrared detector into machine readable information, and means to compare said infrared machine readable information against the standard information stored in said memory.

2. Apparatus for inspecting a device in accordance with claim 1 wherein said means to scan said detector comprises a flying spot scanner, said flying spot scanner including optical means for focusing said infrared detector on said device, said optical means including means to displace the optical axis of said optical means along a coordinate axis.

3. Apparatus for inspecting a device in accordance with claim 1 including standard sources of infrared energy positioned at the beginning and end of each scan of said detector to provide calibration information.

4. Apparatus for inspecting a device in accordance with claim 1 wherein said means to control said means to displace said device along the first axis includes a stepping motor and means in said memory for generating a predetermined set of stepping signals for transmission to said stepper motor.

5. Apparatus for inspecting a component in accordance with claim 1 wherein said means to generate an electronic analog signal comprises a shaft encoder, the coded output signal of said encoder being interfaced with said memory means.

6. Apparatus for making an infrared inspection of a device, comprising means to displace said device along the first axis, an infrared detector, means to scan said infrared detector along an axis coordinate to said first axis, control means for controlling said means to displace said device along said first axis, means to generate an electronic analog signal that corresponds to the instantaneous position of the device that is being scanned by said detector, memory means, said memory means including means for storing information as a standard profile of said device, means to convert infrared signals detected by said infrared detector into machine readable information, and means to compare said infrared machine readable information against the standard information stored in said memory, and coherent radiation means to inject thermal energy into said device.

7. Apparatus for inspecting a device in accordance with claim 6 including means to scan said source of coherent radiation along the same coordinate axis along which said infrared detector is scanned.

8. Apparatus for inspecting a device in accordance with claim 7 including a rotating mirror to scan both said infrared detector and said source of coherent radiation in timed sequence.

* * * * *